(12) United States Patent
Yamaguchi

(10) Patent No.: US 12,306,113 B2
(45) Date of Patent: May 20, 2025

(54) SUBSTRATE INSPECTION APPARATUS, SUBSTRATE INSPECTION METHOD, AND RECORDING MEDIUM

(71) Applicant: Tokyo Electron Limited, Tokyo (JP)

(72) Inventor: Takahiro Yamaguchi, Koshi (JP)

(73) Assignee: TOKYO ELECTRON LIMITED, Tokyo (JP)

(*) Notice: Subject to any disclaimer, the term of this patent is extended or adjusted under 35 U.S.C. 154(b) by 210 days.

(21) Appl. No.: 18/152,858

(22) Filed: Jan. 11, 2023

(65) Prior Publication Data
US 2023/0221262 A1 Jul. 13, 2023

(30) Foreign Application Priority Data
Jan. 12, 2022 (JP) ................. 2022-002786

(51) Int. Cl.
G01N 21/95 (2006.01)
G06T 7/00 (2017.01)
G01N 21/88 (2006.01)

(52) U.S. Cl.
CPC ....... *G01N 21/9501* (2013.01); *G06T 7/0004* (2013.01); *G01N 2021/8845* (2013.01); *G06T 2207/30148* (2013.01)

(58) Field of Classification Search
CPC ........ G01N 21/9501; G01N 2021/8845; G06T 7/0004; G06T 2207/30148
See application file for complete search history.

(56) References Cited

FOREIGN PATENT DOCUMENTS

JP 2009175150 A * 8/2009 ............. G01N 21/88
JP 2015-215193 A 12/2015

* cited by examiner

*Primary Examiner* — Jamil Ahmed
(74) *Attorney, Agent, or Firm* — Chrisman Gallo Tochtrop LLC

(57) ABSTRACT

A substrate inspection apparatus configured to inspect a substrate by using an image of a surface of the substrate includes a holder configured to hold the substrate; a first light source unit configured to emit visible light to the substrate; a second light source unit configured to emit ultraviolet light to the substrate; a first imaging sensor configured to perform capturing of a visible light image of the substrate by receiving reflected light from the substrate; a second imaging sensor configured to perform capturing of an ultraviolet light image of the substrate by receiving reflected light or scattered light from the substrate; and a controller configured to acquire the visible light image from the first imaging sensor and the ultraviolet light image from the second imaging sensor. The visible light image and the ultraviolet light image are images obtained by imaging a common region of the substrate.

7 Claims, 8 Drawing Sheets

SUBSTRATE INSPECTION APPARATUS, SUBSTRATE INSPECTION METHOD, AND RECORDING MEDIUM

CROSS-REFERENCE TO RELATED APPLICATION

This application claims the benefit of Japanese Patent Application No. 2022-002786 filed on Jan. 12, 2022, the entire disclosure of which is incorporated herein by reference.

TECHNICAL FIELD

The various aspects and embodiments described herein pertain generally to a substrate inspection apparatus, a substrate inspection method, and a recording medium.

BACKGROUND

Patent Document 1 describes an apparatus for measuring a film thickness of a film formed on a substrate. In this apparatus, data indicating a correlation between a film thickness measurement value and a pixel value in a captured image of a substrate surface is prepared in advance, and the film thickness of the substrate is estimated from the pixel value of the captured image obtained by imaging the surface of the substrate.
Patent Document 1: Japanese Patent Laid-open Publication No. 2015-215193

SUMMARY

In one exemplary embodiment, there is provided a substrate inspection apparatus configured to inspect a substrate having a target film formed on a surface thereof by using an image of the substrate. The substrate inspection apparatus includes a holder configured to hold the substrate; a first light source unit configured to emit visible light to the substrate held by the holder; a second light source unit configured to emit ultraviolet light to the substrate held by the holder; a first imaging sensor configured to perform capturing of a visible light image of the substrate by receiving reflected light from the substrate as a result of radiating the visible light; a second imaging sensor configured to perform capturing of an ultraviolet light image of the substrate by receiving reflected light or scattered light from the substrate as a result of radiating the ultraviolet light; and a controller configured to acquire the visible light image and the ultraviolet light image. The visible light image and the ultraviolet light image are images obtained by imaging a common region of the substrate.

The foregoing summary is illustrative only and is not intended to be any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
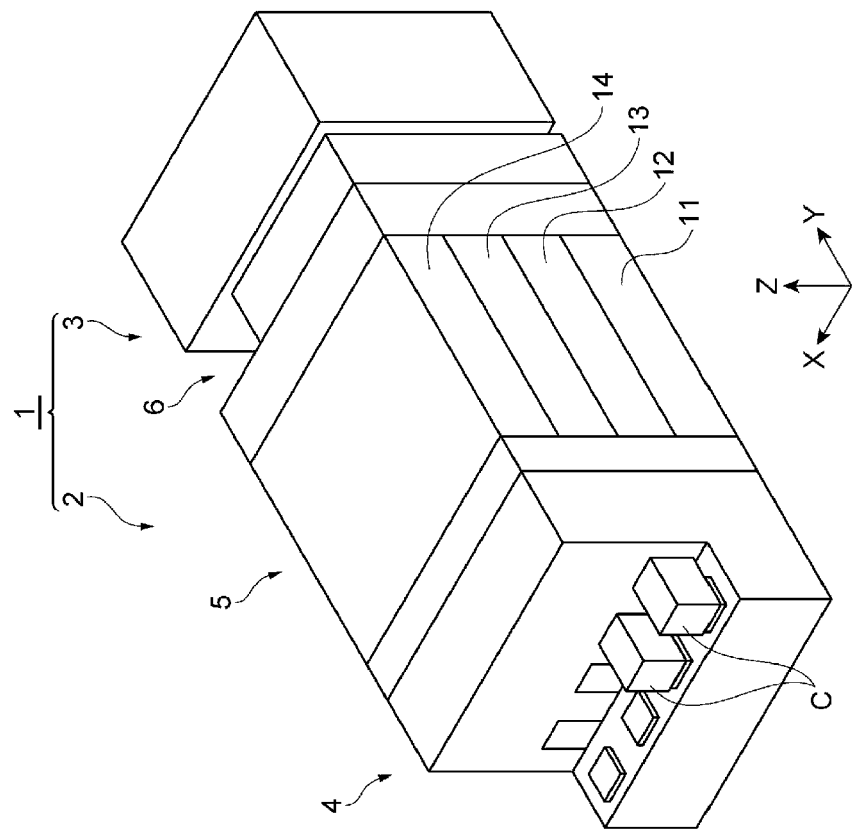
FIG. 1 is a schematic diagram illustrating an example of a configuration of a substrate processing system.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current exemplary embodiment. Still, the exemplary embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Hereinafter, various exemplary embodiments will be described.

In one exemplary embodiment, there is provided a substrate inspection apparatus configured to inspect a substrate having a target film formed on a surface thereof by using an image of the substrate. The substrate inspection apparatus includes a holder configured to hold the substrate; a first light source unit configured to emit visible light to the substrate held by the holder; a second light source unit configured to emit ultraviolet light to the substrate held by the holder; a first imaging sensor configured to perform capturing of a visible light image of the substrate by receiving reflected light from the substrate as a result of radiating the visible light; a second imaging sensor configured to perform capturing of an ultraviolet light image of the substrate by receiving reflected light or scattered light from the substrate as a result of radiating the ultraviolet light; and a controller configured to acquire the visible light image and the ultraviolet light image. The visible light image and the ultraviolet light image are images obtained by imaging a common region of the substrate.

In the substrate inspection apparatus, the visible light image of the substrate is acquired by the first imaging sensor, and the ultraviolet light image of the substrate is acquired by the second imaging sensor. The visible light image and the ultraviolet light image are images obtained by capturing the common region of the substrate. Therefore, the inspection can be performed by using either one of these images depending on the characteristics of the target film formed on the substrate, so that an image enabling detection of a defect on the substrate with higher precision can be acquired.

In the substrate inspection apparatus, the visible light image and the ultraviolet light image may be images obtained by imaging the common region of an entire surface of the substrate. With this configuration, it is possible to inspect the entire surface of the substrate based on these images.

In the substrate inspection apparatus, the visible light image and the ultraviolet light image may be images obtained by imaging the common region of a peripheral portion of the substrate. With this configuration, it is possible to inspect the peripheral portion of the substrate based on these images.

In the substrate inspection apparatus, the controller may control the first imaging sensor and the second imaging sensor such that only the capturing of the visible light image is performed by the first imaging sensor when a film thickness of the target film formed on the surface of the substrate is equal to or larger than a first film thickness value. If the film thickness of the target film increases, the inspection of the target film can be carried out by using the visible light image. Therefore, with the above-described configuration, it is possible to acquire an image enabling detection of a defect of the substrate with high precision for the target film having a film thickness equal to or larger than the first film thickness value.

In the substrate inspection apparatus, the controller may control the first imaging sensor and the second imaging sensor such that only the capturing of the ultraviolet light image is performed by the second imaging sensor when a film thickness of the target film formed on the surface of the substrate is equal to or less than a second film thickness value. If the film thickness of the target film decreases, the inspection of the target film can be carried out by using the ultraviolet light image. Therefore, with the above-described configuration, it is possible to obtain an image enabling detection of a defect of the substrate with high precision for the target film having a film thickness equal to or less than the second film thickness value.

In the substrate inspection apparatus, the controller may control the first imaging sensor and the second imaging sensor such that both the capturing of the visible light image by the first imaging sensor and the capturing of the ultraviolet light image by the second imaging sensor are performed when a film thickness of the target film formed on the surface of the substrate falls between a third film thickness value and a fourth film thickness value. Depending on the film thickness of the target film, it may not be clear which of the visible light image and the ultraviolet light image is suitable for the inspection. In such a case, by adopting the above-described configuration, an image suitable for a defect of the substrate can be used for the inspection.

In the substrate inspection apparatus, the controller may determine, based on a formation sequence of the target film on the substrate, which one of the capturing of the visible light image by the first imaging sensor and the capturing of the ultraviolet light image by the second imaging sensor is to be performed, and may control the first imaging sensor and the second imaging sensor based on a determination result. If the image to be used for the inspection is specified in the formation sequence of the target film, or if information specifying which image is suitable for the inspection is included in the formation sequence of the target film, the image to be used may be determined based on this information, and each imaging sensor may be controlled accordingly.

In the substrate inspection apparatus, the second imaging sensor may be allowed to capture a bright field image and a dark field image as the ultraviolet light image, and the controller may acquire the bright field image and the dark field image as the ultraviolet light image from the second imaging sensor. In the ultraviolet light image, different information about the substrate may sometimes be obtained from the bright field image and the dark field image. Thus, by adopting the configuration in which both of the bright field and dark field images are acquired, it is possible to obtain an image suitable for higher-precision inspection of the substrate.

In another exemplary embodiment, there is provided a substrate inspection method of inspecting a substrate having a target film formed on a surface thereof by using an image of the substrate. The substrate inspection method includes holding the substrate by a holder; emitting visible light from a first light source unit to the substrate held by the holder; emitting ultraviolet light from a second light source unit to the substrate held by the holder; capturing a visible light image of the surface of the substrate by receiving reflected light from the substrate with a first imaging sensor as a result of radiating the visible light; capturing an ultraviolet light image of the surface of the substrate by receiving reflected light or scattered light from the substrate with a second imaging sensor as a result of radiating the ultraviolet light; and acquiring the visible light image and the ultraviolet light image by a controller. The visible light image and the ultraviolet light image are images obtained by imaging a common region of the substrate.

In the substrate inspection method, the visible light image of the substrate is acquired by the first imaging sensor, and the ultraviolet light image of the substrate is acquired by the second imaging sensor. The visible light image and the ultraviolet light image are images obtained by capturing the common region of the substrate. Therefore, the inspection can be performed by using either one of these images depending on the characteristics of the target film formed on the substrate, so that an image enabling detection of a defect on the substrate with higher precision can be acquired.

In the substrate inspection method, the visible light image and the ultraviolet light image may be images obtained by imaging the common region of an entire surface of the substrate. With this configuration, it is possible to inspect the entire surface of the substrate based on these images.

In the substrate inspection method, the visible light image and the ultraviolet light image may be images obtained by imaging the common region of a peripheral portion of the substrate. With this configuration, it is possible to inspect the peripheral portion of the substrate based on these images.

The substrate inspection method may further include controlling the first imaging sensor and the second imaging sensor by the controller such that only the capturing of the visible light image is performed by the first imaging sensor when a film thickness of the target film formed on the surface of the substrate is equal to or larger than a first film thickness value. If the film thickness of the target film increases, the inspection of the target film can be carried out by using the visible light image. Therefore, with the above-described configuration, it is possible to acquire an image enabling detection of a defect of the substrate with high precision for the target film having a film thickness equal to or larger than the first film thickness value.

The substrate inspection method may further include controlling the first imaging sensor and the second imaging sensor by the controller such that only the capturing of the ultraviolet light image is performed by the second imaging sensor when a film thickness of the target film formed on the surface of the substrate is equal to or less than a second film thickness value. If the film thickness of the target film decreases, the inspection of the target film can be carried out by using the ultraviolet light image. Therefore, with the above-described configuration, it is possible to obtain an image enabling detection of a defect of the substrate with high precision for the target film having a film thickness equal to or less than the second film thickness value.

The substrate inspection method may further include controlling the first imaging sensor and the second imaging sensor by the controller such that both the capturing of the visible light image by the first imaging sensor and the capturing of the ultraviolet light image by the second imaging sensor are performed when a film thickness of the target film formed on the surface of the substrate falls between a third film thickness value and a fourth film thickness value. Depending on the film thickness of the target film, it may not be clear which of the visible light image and the ultraviolet light image is suitable for the inspection. In such a case, by adopting the above-described configuration, an image suitable for a defect of the substrate can be used for the inspection.

The substrate inspection method may further include determining, based on a formation sequence of the target film on the substrate, which one of the capturing of the visible light image by the first imaging sensor and the capturing of the ultraviolet light image by the second imaging sensor is to be performed, and controlling the first imaging sensor and the second imaging sensor based on a determination result by the controller. If the image to be used for the inspection is specified in the formation sequence of the target film, or if information specifying which image is suitable for the inspection is included in the formation sequence of the target film, the image to be used may be determined based on this information, and each imaging sensor may be controlled accordingly.

In the substrate inspection method, the second imaging sensor may be allowed to capture a bright field image and a dark field image as the ultraviolet light image, and in the acquiring of the visible light image and the ultraviolet light image, the controller may acquire the bright field image and the dark field image as the ultraviolet light image from the second imaging sensor. In the ultraviolet light image, different information about the substrate may sometimes be obtained from the bright field image and the dark field image. Thus, by adopting the configuration in which both of the bright field and dark field images are acquired, it is possible to obtain an image suitable for higher-precision inspection of the substrate.

The substrate inspection method may further include determining, by the controller, which one of the bright field image and the dark field image is to be captured by the second imaging sensor based on a formation sequence of the target film on the substrate, and controlling the second imaging sensor based on a determination result. If the image to be used for the inspection is specified in the formation sequence of the target film, or if information specifying which image is suitable for the inspection is included in the formation sequence of the target film, the bright field image or the dark field image to be used may be determined based on this information, and each imaging sensor may be controlled accordingly.

In still another exemplary embodiment, there is provided a recording medium having stored thereon a computer-executable substrate inspection program that, in response to execution, cause a substrate inspection apparatus to perform an inspection of a substrate having a target film formed on a surface thereof by using an image of the substrate. The substrate inspection program includes holding the substrate by a holder; emitting visible light from a first light source unit to the substrate held by the holder; emitting ultraviolet light from a second light source unit to the substrate held by the holder; capturing a visible light image of the surface of the substrate by receiving reflected light from the substrate with a first imaging sensor as a result of radiating the visible light; capturing an ultraviolet light image of the surface of the substrate by receiving reflected light or scattered light from the substrate with a second imaging sensor as a result of radiating the ultraviolet light; and acquiring the visible light image and the ultraviolet light image by a controller. The visible light image and the ultraviolet light image are images obtained by imaging a common region of the substrate.

According to the above-described substrate inspection program, the same effects as obtained by the substrate inspection method can be achieved.

Hereinafter, various exemplary embodiments will be described in detail with reference to the accompanying drawings. Further, in the various drawings, same or corresponding parts will be assigned same reference numerals.

[Substrate Processing System]

A substrate processing system 1 is a system configured to perform formation of a photosensitive film, exposure of the photosensitive film, and development of the photosensitive film on a workpiece W. The workpiece W to be processed is, for example, a substrate or a substrate having a film or a circuit formed thereon after being subjected to a preset processing. The substrate is, for example, a silicon wafer. The workpiece W (substrate) may be of a circular shape. For another example, the workpiece W may be a glass substrate, a mask substrate, or a flat panel display (FPD). The photosensitive film is, by way of example, a resist film.

Figure 2:
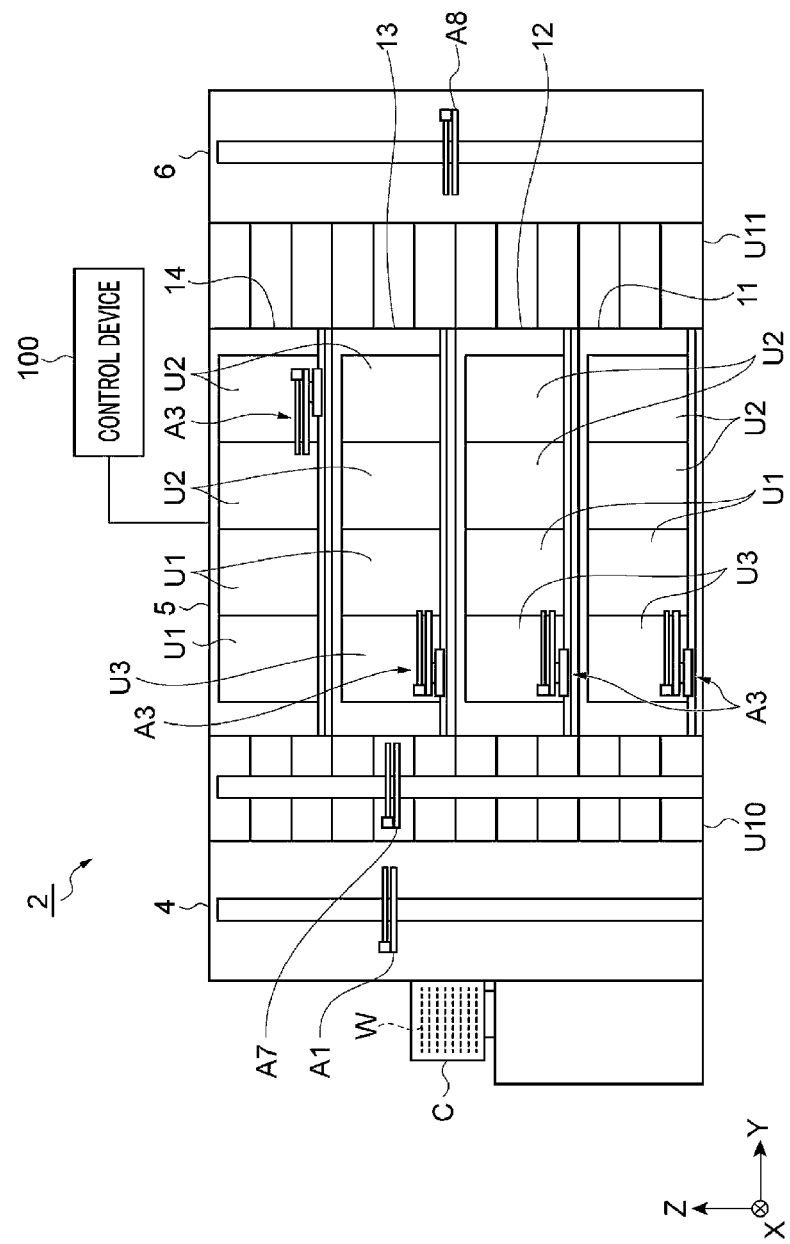
FIG. 2 is a schematic diagram illustrating an example of a coating and developing apparatus.

As illustrated in FIG. 1 and FIG. 2, the substrate processing system 1 includes a coating and developing apparatus 2 and an exposure apparatus 3. The exposure apparatus 3 is configured to perform an exposure process on a resist film (photosensitive film) coated on the workpiece W (substrate). Specifically, the exposure apparatus 3 radiates an energy beam to an exposure target portion of the resist film by a liquid immersion exposure method or the like. The coating and developing apparatus 2 performs a process of coating the resist film on a front surface of the workpiece W (substrate) before the exposure process by the exposure apparatus 3, and then performs a developing process on the resist film after the exposure process. By performing the series of processes, the resist film having a predetermined pattern is formed.

[Substrate Inspection Apparatus]

Hereinafter, a configuration of the coating and developing apparatus 2 as an example of a substrate processing apparatus will be explained. As shown in FIG. 1 and FIG. 2, the coating and developing apparatus 2 is equipped with a carrier block 4, a processing block 5, an interface block 6, and a control device 100 (controller). The control device 100 is connected with a display unit 200. The coating and developing apparatus 2 as a substrate inspection apparatus to be described in the present exemplary embodiment has a function of inspecting a state of a target film formed on the substrate.

The carrier block 4 is configured to perform a carry-in of the workpiece W into the coating and developing apparatus 2 and a carry-out of the workpiece W from the coating and developing apparatus 2. For example, the carrier block 4 is configured to support a plurality of carriers C (accommodating portions) for the workpiece W, and incorporates therein a transfer device A1 including a delivery arm. The carrier C accommodates therein a multiple number of workpieces W having a circular shape, for example. The transfer device A1 takes out the workpiece W from the carrier C, hands the workpiece W over to the processing block 5, receives the workpiece W from the processing block 5, and returns the workpiece W into the carrier C. The processing block 5 has multiple processing modules 11, 12, 13 and 14.

The processing module 11 incorporates therein a plurality of coating units U1, a plurality of heat treatment units U2, a plurality of imaging units U3, and a transfer device A3 configured to transfer the workpiece W to these units. The processing module 11 is configured to form a bottom film on the front surface of the workpiece W by the coating unit U1 and the heat treatment unit U2. The coating unit U1 of the processing module 11 is configured to coat a processing liquid for forming the bottom film on the workpiece W while rotating the workpiece W at a preset rotation speed, for example. The heat treatment unit U2 of the processing module 11 is configured to perform various kinds of heat treatments required to form the bottom film. The heat treatment unit U2 incorporates therein, for example, a heating plate and a cooling plate, and performs a heat treatment by heating the workpiece W to a predetermined heating temperature with the heating plate and cooling the heated workpiece W with the cooling plate. The imaging unit U3 is configured to perform a processing for inspecting a surface state of the workpiece W, and acquires, as information indicating the surface state of the workpiece W, information regarding a surface image, for example.

The processing module 12 incorporates therein a plurality of coating units U1, a plurality of heat treatment units U2, a plurality of imaging units U3, and a transfer device A3 configured to transfer the workpiece W to these units. The processing module 12 is configured to form an intermediate film on the bottom film by the coating unit U1 and the heat treatment unit U2. The coating unit U1 of the processing module 12 is configured to coat a processing liquid for forming the intermediate film on the bottom film, thus forming a coating film on the surface of the workpiece W. The heat treatment unit U2 of the processing module 12 is configured to perform various kinds of heat treatments required to form the intermediate film. The heat treatment unit U2 incorporates therein, for example, a heating plate and a cooling plate, and performs a heat treatment by heating the workpiece W to a predetermined heating temperature with the heating plate and cooling the heated workpiece W with the cooling plate. The imaging unit U3 is configured to perform a processing for inspecting a surface state of the workpiece W, and acquires, as information indicating the surface state of the workpiece W, information regarding a surface image, for example.

The processing module 13 incorporates therein a plurality of coating units U1, a plurality of heat treatment units U2, a plurality of imaging units U3, and a transfer device A3 configured to transfer the workpiece W to these units. The processing module 13 is configured to form a resist film on the intermediate film by the coating unit U1 and the heat treatment unit U2. The coating unit U1 of the processing module 13 is configured to coat a processing liquid for forming the resist film on the intermediate film while rotating the workpiece W at a preset rotation speed, for example. The heat treatment unit U2 of the processing module 13 is configured to perform various kinds of heat treatments required to form the resist film. The heat treatment unit U2 of the processing module 13 forms a resist film by performing, at a predetermined heating temperature, a heat treatment (PAB: Post Applied Bake) on the workpiece W on which the coating film is formed. The imaging unit U3 is configured to perform a processing of inspecting a surface state of the workpiece W, and configured to acquire, as information indicating the surface state of the workpiece W, information regarding a surface image, for example.

The processing module 14 incorporates therein a plurality of coating units U1, a plurality of heat treatment unit U2, and a transfer device A3 configured to transfer the workpiece W to these units. The processing module 14 is configured to perform a developing processing on the exposed resist film R by the coating unit U1 and the heat treatment unit U2. For example, the coating unit U1 of the processing module 14 performs the developing processing on the resist film R by coating a developing liquid on the front surface of the exposed workpiece W while rotating the workpiece W at a predetermined rotation speed and then washing away the coated developing liquid with a rinse liquid. The heat treatment unit U2 of the processing module 14 is configured to perform various kinds of heat treatments required for the developing processing. Specific examples of these heat treatments include a heat treatment (PEB: Post Exposure Bake) before developing processing, a heat treatment (PB: Post Bake) after developing processing, and so forth.

Within the processing block 5, a shelf unit U10 is provided near the carrier block 4. The shelf unit U10 is partitioned into a multiple number of cells arranged in a vertical direction. A transfer device A7 including an elevating arm is provided in the vicinity of the shelf unit 10. The transfer device A7 is configured to move the workpiece W up and down between the cells of the shelf unit U10.

Within the processing block 5, a shelf unit U11 is provided near the interface block 6. The shelf unit U11 is partitioned into a multiple number of cells arranged in the vertical direction.

The interface block 6 is configured to deliver the workpiece W to/from the exposure apparatus 3. By way of example, the interface block 6 incorporates therein a transfer device A8 including a delivery arm and is connected to the exposure apparatus 3. The transfer device A8 is configured to deliver the workpiece W placed in the shelf unit U11 to the exposure apparatus 3, receive the workpiece W from the exposure apparatus 3 and return the workpiece W back into the shelf unit U11.

[Imaging Unit]

Figure 3:
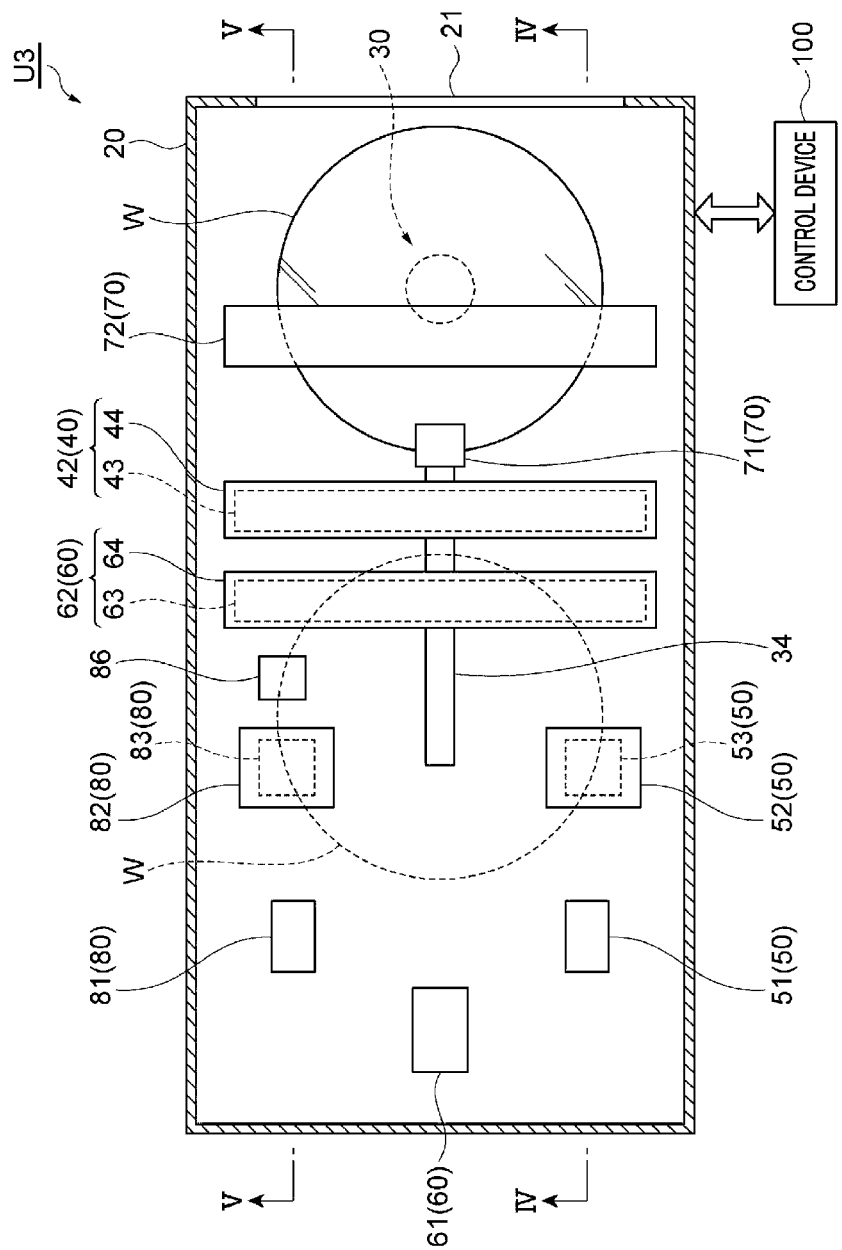
FIG. 3 is a schematic diagram illustrating an example of a configuration of an imaging unit seen from above.
Figure 4:
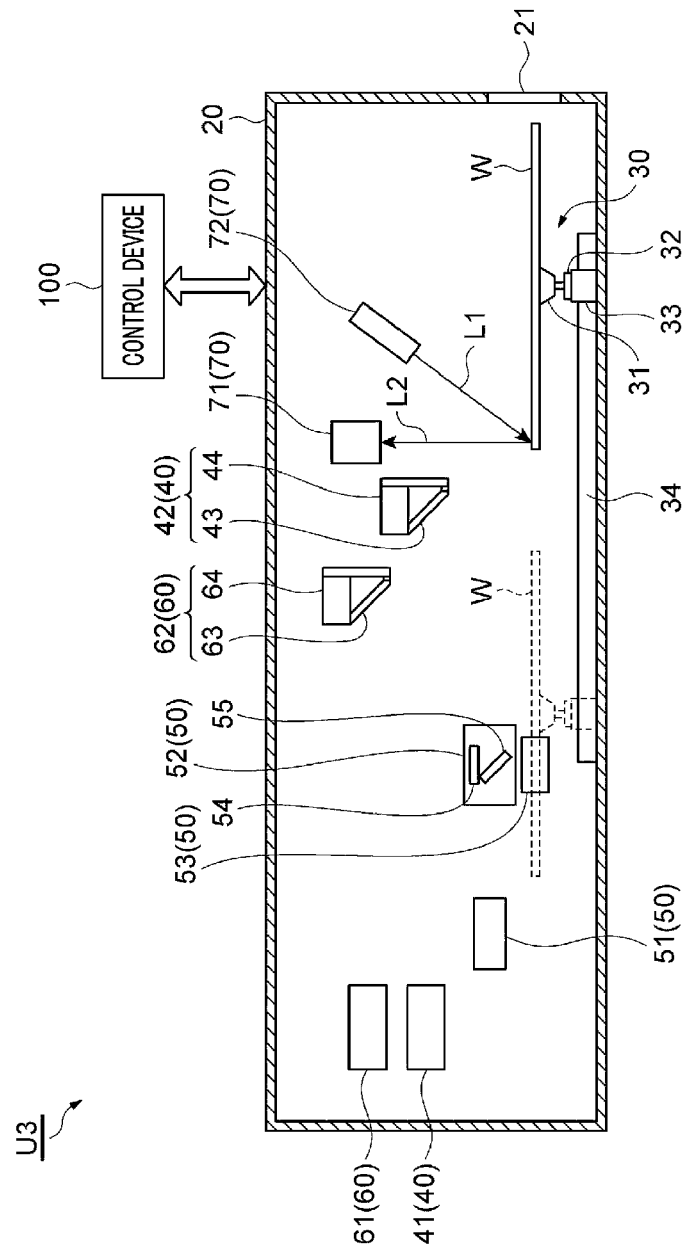
FIG. 4 is a schematic diagram illustrating an example of a configuration of the imaging unit seen from the side.
Figure 5:
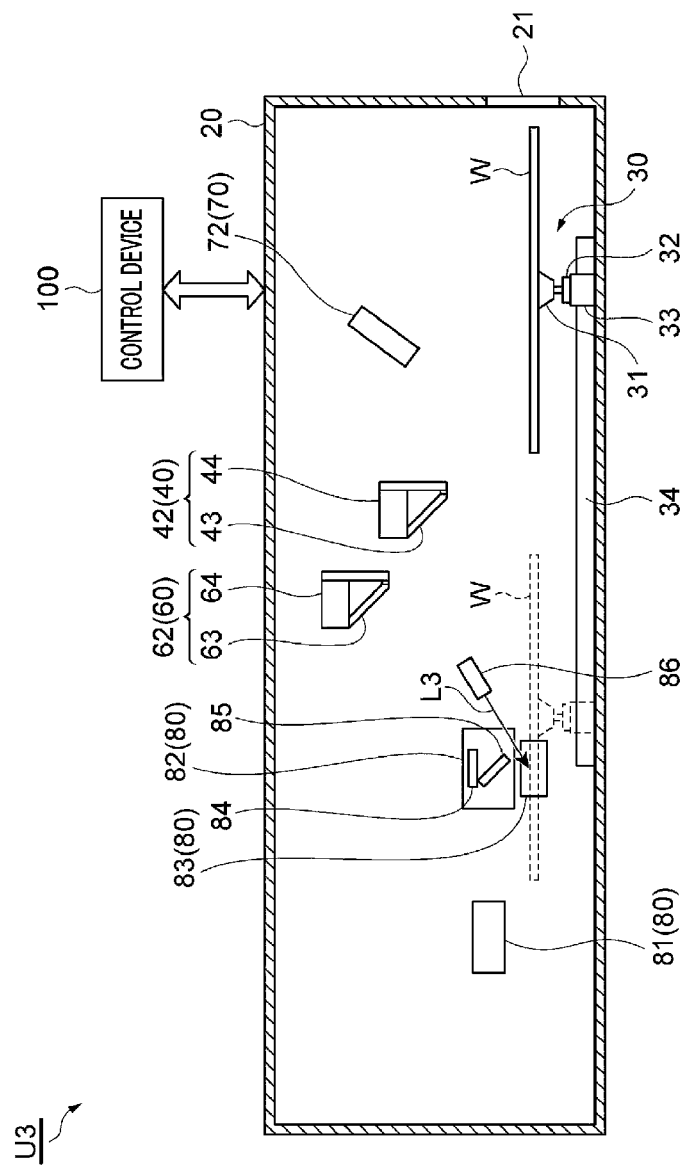
FIG. 5 is a schematic diagram illustrating an example of a configuration of the imaging unit seen from the side.

The imaging unit U3 included in the processing modules 11 to 13 will be described with reference to FIG. 3 to FIG. 5. FIG. 4 is a diagram seen from the direction of arrow IV-IV in FIG. 3, and FIG. 5 is a diagram seen from the direction of arrow V-V in FIG. 3. In FIG. 5, for reference, a structure regarding a rotating/holding subunit 30 to be described later is shown in the same way as in FIG. 4.

The imaging unit U3 has a function of obtaining image data by imaging a front surface of the film (for example, the bottom film, the intermediate film, the resist film, etc.) formed by the coating unit U1 and the heat treatment unit U2. As shown in FIG. 3 to FIG. 5, the imaging unit U3 includes a housing 20, the rotating/holding subunit 30, a surface visible light imaging subunit 40, a peripheral visible light imaging subunit 50, a first surface ultraviolet light imaging subunit 60, a second surface ultraviolet light imaging subunit 70, and a peripheral ultraviolet light imaging subunit 80. These subunits are disposed in the housing 20. At one end of the wall of the housing 20, a carry-in/out opening 21 through which the workpiece W is carried into/out of the housing 20 is formed.

The rotating/holding subunit 30 includes a holding table 31, actuators 32 and 33, and a guide rail 34. The holding table 31 is, by way of example, an attraction chuck configured to hold the workpiece W in a substantially horizontal manner by attraction or the like. The rotating/holding subunit 30 functions as a holder that holds the workpiece W.

The actuator 32 is, by way of non-limiting example, an electric motor, and is configured to rotate the holding table 31. That is, the actuator 32 rotates the workpiece W held by the holding table 31. The actuator 32 may include an encoder for detecting a rotation position of the holding table 31. In this case, it is possible to match imaging positions of respective surfaces of the workpiece W by the individual imaging subunits with rotation positions. When the workpiece W has a notch, the posture of the workpiece W can be specified based on the notch detected by each imaging subunit and the rotation position detected by the encoder. Here, the rotation position of the holding table 31 refers to a rotation angle of the holding table 31.

The actuator 33 is, by way of non-limiting example, a linear actuator, and is configured to move the holding table 31 along the guide rail 34. That is, the actuator 33 transfers the workpiece W held on the holding table 31 between one end side and the other end side of the guide rail 34. Therefore, the workpiece W held on the holding table 31 can be moved between a first position on the side of the carry-in/out opening 21 and a second position on the side of the peripheral visible light imaging subunit 50. The guide rail 34 extends in a linear shape (for example, in a straight line shape) in the housing 20.

The surface visible light imaging subunit 40 includes a camera 41 (first imaging sensor), and an illumination module 42. The camera 41 includes a lens and one imaging device (for example, a CCD image sensor, a CMOS image sensor, etc.). The camera 41 faces the illumination module 42.

The illumination module 42 includes a half mirror 43 and a light source 44 (first light source unit). The half mirror 43 is disposed in the housing 20 while being inclined at about 45 degrees with respect to a horizontal direction. The half mirror 43 is located above a middle portion of the guide rail 34 so as to intersect the extension direction of the guide rail 34 when viewed from above. The half mirror 43 has a rectangular shape. The length (length of the longer side) of the half mirror 43 is larger than the diameter of the workpiece W.

The light source 44 is positioned above the half mirror 43 and emits visible light. A wavelength range of the light emitted from the light source 44 is not particularly limited as long as it is within general visible light range (as an example, wavelengths of 380 nm to 780 nm). As an example, white light including all lights in the wavelength range of the visible light may be used.

The light emitted from the light source 44 passes through the half mirror 43 in overall and is radiated downwards (to the guide rail 34 side). The light that has passed through the half mirror 43 is reflected on an object located below the half mirror 43, then reflected again by the half mirror 43, passes through the lens of the camera 41, and then reaches the imaging device of the camera 41. That is, the camera 41 is capable of imaging the object existing in a radiation area of the light source 44 through the half mirror 43. For example, when the holding table 31 holding the workpiece W is moved along the guide rail 34 by the actuator 33, the camera 41 is capable of imaging the front surface of the workpiece W passing through the radiation area of the light source 44. The captured image data obtained by the camera 41 is transmitted to the control device 100.

The peripheral visible light imaging subunit 50 includes a camera 51 (first imaging sensor), an illumination module 52, and a mirror member 53. The camera 51 includes a lens and one imaging device (for example, a CCD image sensor, a CMOS image sensor, etc.). The camera 51 faces the illumination module 52. A target of imaging by the peripheral visible light imaging subunit 50 is a periphery of the front surface of the workpiece W and an end surface of the workpiece W. In the following description of the exemplary embodiment, the term "peripheral portion of the workpiece W (substrate)" may be referred to include them.

The illumination module 52 is disposed above the workpiece W held on the holding table 31. The illumination module 52 includes a light source 54 (first light source unit) and a half mirror 55. The light source 54 emits visible light. A wavelength range of the light emitted from the light source 54 is not particularly limited as long as it is within the range of visible light. As an example, white light including all lights in the wavelength range of the visible light may be used. As illustrated in FIG. 4, the half mirror 55 is inclined at an angle of about 45 degrees with respect to the horizontal direction. The mirror member 53 is disposed below the illumination module 52, as shown in FIG. 3 and FIG. 4. The mirror member 53 includes a main body formed of an aluminum block, and a reflective surface.

The reflective surface of the mirror member 53 faces the end surface and a peripheral portion of a rear surface of the workpiece W held on the holding table 31 when the workpiece W held on the holding table 31 is located at the second position. The reflective surface of the mirror member 53 is inclined with respect to a rotation axis of the holding table 31. The reflective surface of the mirror member 53 is mirror-processed. By way of example, a mirror sheet may be attached to the reflective surface, an aluminum coating may be applied thereon, or an aluminum material may be deposited thereon. This reflective surface is a curved surface that is concave toward the side away from the end surface of the workpiece W held by the holding table 31.

In the illumination module 52, the light emitted from the light source 54 passes through the half mirror 55 in overall and is radiated downwards. The light having passed through the half mirror 55 is reflected on a reflective surface of the mirror member 53 positioned below the half mirror 55. When the workpiece W held on the holding table 31 is located at the second position, the reflected light reflected from the reflective surface of the mirror member 53 after passing through the half mirror 55 is mainly radiated to the end surface of the workpiece W and the periphery of the front surface of the workpiece W.

The reflected light reflected from the periphery of the front surface of the workpiece W is not directed toward the reflective surface of the mirror member 53 but is directly incident on the half mirror 55. Thereafter, this reflected light reaches the imaging device of the camera 51. Meanwhile, the reflected light reflected from the end surface of the workpiece W is directed toward the direction of the reflective surface of the mirror member 53. This reflected light is sequentially reflected by the reflective surface of the mirror member 53 and the half mirror 55 to reach the imaging device of the camera 51. In this way, the reflected light from the periphery of the workpiece W and the reflected light from the end surface of the workpiece W reach the imaging device of the camera 51 through the different optical paths. As a result, both the light from the periphery of the front surface of the workpiece W and the light from the end surface of the workpiece W are inputted to the imaging device of the camera 51. That is, the camera 51 is configured to image both the periphery of the front surface of the workpiece W and the end surface of the workpiece W to produce captured images of the periphery of the front surface and the end surface of the workpiece W when the workpiece W held on the holding table 31 is located at the second position. The captured image data obtained by the camera 51 is transmitted to the control device 100.

The first surface ultraviolet light imaging subunit 60 includes a camera 61 (second imaging sensor), and an illumination module 62. The camera 61 includes a lens and one imaging device (for example, a CCD image sensor, CMOS image sensor, etc.). The camera 61 faces the illumination module 62. The illumination module 62 includes a half mirror 63 and a light source 64 (second light source unit).

Since the first surface ultraviolet light imaging subunit 60 is substantially the same as the surface visible light imaging subunit 40 except for the type of the light source 64 included in the illumination module 62, a detailed description thereof will be omitted here.

The light source 64 is positioned above the half mirror 63 and emits ultraviolet light. Regarding the ultraviolet light emitted from the light source 64, the present exemplary embodiment will be described for a case of using light having a wavelength range close to visible light among so-called near ultraviolet light having a wavelength in the range of 300 nm to 400 nm. The wavelength range of the light emitted from the light source 64 is not particularly limited as long as it includes the range of the ultraviolet light. However, the light emitted from the light source 64 may also contain a component other than the aforementioned ultraviolet light. As an example, light of a single wavelength in a wavelength range of 350 nm to 400 nm may be used as the ultraviolet light from the light source 64, and, for example, light having a wavelength of around 400 nm may be used. As another example, the light source 64 may contain light in a wavelength range of 300 nm to 450 nm. The ultraviolet light in the above-specified wavelength range causes little damage to the film to be inspected in the imaging unit U3. Further, in the film formed on the workpiece W, absorption efficiency for the ultraviolet light in the above-described wavelength range is higher than absorption efficiency for the visible light. In other words, the reflected light or scattered light in the film that easily absorbs the ultraviolet light may include information reflecting the shape and the property of the film better.

An imaging operation of the first surface ultraviolet light imaging subunit 60 is substantially the same as that of the surface visible light imaging subunit 40. The light emitted from the light source 64 passes through the half mirror 63 in overall, and is radiated downwards (to the guide rail 34 side). The light having passed through the half mirror 63 is reflected on an object positioned below the half mirror 63, then reflected again by the half mirror 63, passes through the lens of the camera 61, and then reaches the imaging device of the camera 61. That is, the camera 61 is capable of imaging the object existing in the radiation area of the light source 64 through the half mirror 63. For example, when the holding table 31 holding the workpiece W is moved along the guide rail 34 by the actuator 33, the camera 61 is capable of imaging the front surface of the workpiece W passing through the radiation area of the light source 64. The captured image data obtained by the camera 61 is transmitted to the control device 100.

In this way, the first surface ultraviolet light imaging subunit 60 has a function of acquiring a bright field image when the ultraviolet light is radiated to the front surface of the workpiece W.

Meanwhile, the second surface ultraviolet light imaging subunit 70 has a function of acquiring a dark field image when the ultraviolet light is radiated to the front surface of the workpiece W.

The second surface ultraviolet light imaging subunit 70 includes a camera 71 (second imaging sensor), and a light source 72 (second light source unit). The camera 71 includes a lens and one imaging device (for example, a CCD image sensor, a CMOS image sensor, etc.). The lens of the camera 71 is provided on the side facing the front surface of the workpiece W.

The light source 72 emits ultraviolet light. The characteristics of the light emitted from the light source 72 are the same as those of the light emitted from the light source 64 and are not particularly limited as long as it includes light in a wavelength range of the ultraviolet light. Further, light of a single wavelength in a wavelength range of 300 nm to 400 nm may be used as the light emitted from the light source 72. For example, light having a wavelength of around 400 nm may be used.

The direction of the emission of the ultraviolet light from the light source 72 is not perpendicular to the front surface of the workpiece W, but is inclined. As an example, as shown in FIG. 4, the light source 72 emits ultraviolet light L1 that is inclined in a direction from the first position on the side of the carry-in/out opening 21 toward the second position on the side of the peripheral visible light imaging subunit 50.

As depicted in FIG. 4, the ultraviolet light L1 emitted from the light source 72 of the second surface ultraviolet light imaging subunit 70 is radiated downwards in the direction inclined with respect to the front surface of the workpiece W. The ultraviolet light L1 is then reflected on an object below. At this time, scattered light L2 from the object below passes through the lens of the camera 71 and reaches the imaging device of the camera 71. That is, the camera 71 receives the scattered light L2 from the object present in the radiation area of the ultraviolet light L1 from the light source 72, and captures a dark field image for the ultraviolet light L1. For example, when the holding table 31 holding the workpiece W is moved along the guide rail 34 by the actuator 33, the camera 71 is capable of capturing a dark field image of the front surface of the workpiece W passing through the radiation area of the light source 72. The captured image data obtained by the camera 71 is transmitted to the control device 100.

Like the surface visible light imaging subunit 40, both the first surface ultraviolet light imaging subunit 60 and the second surface ultraviolet light imaging subunit 70 image the front surface of the workpiece W. That is, these subunits acquire the images of the same area (two-dimensional area).

The peripheral ultraviolet light imaging subunit 80 includes a camera 81 (second imaging sensor), an illumination module 82, and a mirror member 83. The camera 81 includes a lens and one imaging device (for example, a CCD image sensor, CMOS image sensor, etc.). The camera 81 faces the illumination module 82. The same as the peripheral visible light imaging subunit 50, a target of imaging by the peripheral ultraviolet light imaging subunit 80 is the periphery of the front surface of the workpiece W and the end surface of the workpiece W (peripheral portion of the workpiece W).

The illumination module 82 is disposed above the workpiece W held on the holding table 31. The illumination module 82 includes a first light source 84 (first light source unit), a half mirror 85, and a second light source 86 (second light source unit). Among these, the second light source 86 is provided at a position spaced apart from the other members.

The first light source 84 emits ultraviolet light. The characteristics of the light emitted from the first light source 84 are the same as those of the light emitted from the light source 64 and are not particularly limited as long as it includes light in a wavelength range of the ultraviolet light. Further, light having a single wavelength in a wavelength range of 300 nm to 400 nm may be used as the light emitted from the light source 84. For example, light having a wavelength of around 400 nm may be used. The half mirror 85 is inclined at an angle of about 45 degrees with respect to the horizontal direction, as illustrated in FIG. 5. The mirror member 83 is disposed below the illumination module 82, as shown in FIG. 3 and FIG. 5. The mirror member 83 includes a main body formed of an aluminum block and a reflective surface.

When the workpiece W held by the holding table 31 is located at the second position, the reflective surface of the mirror member 83 faces the end surface of the workpiece W and the peripheral portion of the rear surface of the workpiece W held by the holding table 31. The reflective surface of the mirror member 83 is inclined with respect to the rotation axis of the holding table 31. The reflective surface of the mirror member 83 is mirror-processed. By way of example, a mirror sheet may be attached to the reflective surface, an aluminum coating may be applied thereon, or an aluminum material may be deposited thereon. This reflective surface is a curved surface that is concave toward the side away from the end surface of the workpiece W held on the holding table 31.

In the illumination module 82, the light emitted from the first light source 84 passes through the half mirror 85 in overall and is radiated downwards. The light having passed through the half mirror 85 is reflected on the reflective surface of the mirror member 83 positioned below the half mirror 85. When the workpiece W held on the holding table 31 is located at the second position, the reflected light having passed through the half mirror 85 and reflected on the reflective surface of the mirror member 83 is mainly radiated to the end surface of the workpiece W and the periphery of the front surface thereof.

The reflected light reflected from the periphery of the front surface of the workpiece W is directly incident on the half mirror 85 without being directed to the reflective surface of the mirror member 83. Thereafter, this reflected light reaches the imaging device of the camera 81. Meanwhile, the reflected light reflected from the end surface of the workpiece W is directed toward the direction of the reflective surface of the mirror member 83. This reflected light is sequentially reflected by the reflective surface of the mirror member 83 and the half mirror 85, and then reaches the imaging device of the camera 81. In this way, the reflected light from the periphery of the workpiece W and the reflected light from the end surface of the workpiece W reach the imaging device of the camera 81 through the different optical paths. As a result, both the light from the periphery of the front surface of the workpiece W and the light from the end surface of the workpiece W are inputted to the imaging device of the camera 81. That is, the camera 81 is configured to image both the periphery of the front surface of the workpiece W and the end surface of the workpiece W when the ultraviolet light is radiated from the first light source 84, thus generating captured images of the periphery of the front surface and the end surface of the workpiece W when the workpiece W held on the holding table 31 is located at the second position. At this time, the images captured by the camera 81 are bright field images. The captured image data obtained by the camera 81 is transmitted to the control device 100.

Meanwhile, the second light source 86 is a light source used to capture a dark field image by ultraviolet light with the camera 81 of the peripheral ultraviolet light imaging subunit 80. For example, the second light source 86 is disposed closer to the first position than the illumination module 82 is. The second light source 86 emits ultraviolet light. The characteristics of the light emitted from the second light source 86 are the same as those of the light emitted from the light source 64 and are not particularly limited as long as it includes light in a wavelength range of the ultraviolet light. Light having a single wavelength in a wavelength range of 300 nm to 400 nm may be used as the light emitted from the second light source 86. For example, light having a wavelength of around 400 nm may be used. The direction of the emission of the ultraviolet light from the second light source 86 is not perpendicular to the front surface of the workpiece W, but is inclined. As an example, as shown in FIG. 5, the second light source 86 emits inclined ultraviolet light L3 in a direction from the first position toward the second position.

Some of scattered lights of the ultraviolet light L3 emitted from the second light source 86 are incident on the camera 81 through the half mirror 85 and the mirror member 83. Specifically, some of the scattered light from the periphery of the front surface of the workpiece W are directly incident on the half mirror 85 without being directed to the reflective surface of the mirror member 83. Then, this light is incident on the imaging device of the camera 81. Meanwhile, some of the scattered light from the end surface of the workpiece W is directed toward the reflective surface of the mirror member 83. This light is sequentially reflected by the reflective surface of the mirror member 83 and the half mirror 85, and then reaches the imaging device of the camera 81. In this way, the scattered light from the periphery of the workpiece W and the scattered light from the end surface of the workpiece W reach the imaging device of the camera 81 through the different optical paths. As a result, both the light from the periphery of the front surface of the workpiece W and the light from the end surface of the workpiece W are inputted to the imaging device of the camera 81. That is, the camera 81 is configured to image both the periphery of the front surface of the workpiece W and the end surface of the workpiece W when the ultraviolet light is radiated from the second light source 86, thus generating captured images of the periphery of the front surface and the end surface of the workpiece W when the workpiece W held on the holding table 31 is located at the second position. At this time, the images captured by the camera 81 are dark field images. The captured image data obtained by the camera 81 is transmitted to the control device 100.

Further, in the above-described peripheral ultraviolet light imaging subunit 80, it is not possible to capture a bright field image and a dark field image simultaneously. Thus, when both a bright field image and a dark field image need to be acquired, a process of capturing the bright field image and a process of capturing the dark field image are performed separately.

Like the peripheral visible light imaging subunit 50, the above-described peripheral ultraviolet light imaging subunit 80 images the periphery and the end surface of the workpiece W. That is, these subunits acquire the images of the same area (two-dimensional area).

[Control Device]

An example of the control device 100 will be described in detail. The control device 100 controls the individual components included in the coating and developing apparatus 2. The control device 100 is configured to implement a process including forming each of the above-described films on the front surface of the workpiece W and performing the developing processing. In addition, the control device 100 is configured to implement a process of inspecting the front surface of the workpiece W and displaying the result. Here, in the coating and developing apparatus 2, a configuration example of the control device 100 as a substrate inspection apparatus configured to perform a substrate inspection will be described.

Figure 6:
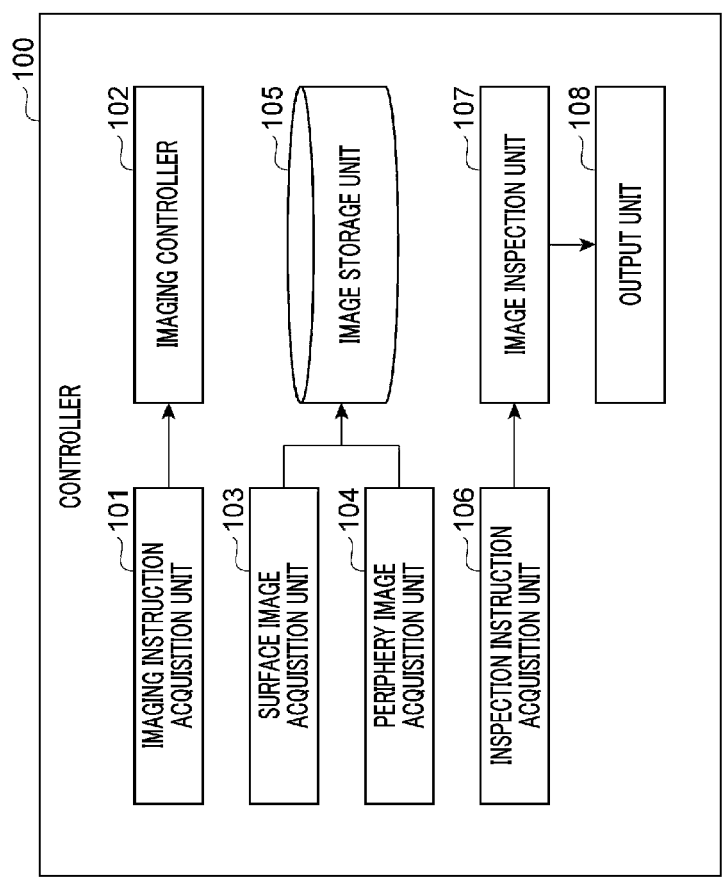
FIG. 6 is a block diagram illustrating an example of a functional configuration of a control device.

As shown in FIG. 6, the control device 100 has, as functional components, an imaging instruction acquisition unit 101, an imaging controller 102, a surface image acquisition unit 103, a periphery image acquisition unit 104, an image storage unit 105, an inspection instruction acquisition unit 106, an image inspection unit 107, and an output unit 108.

The imaging instruction acquisition unit 101 has a function of acquiring an instruction regarding the imaging of the workpiece W in the imaging unit U3. The instruction may be given by, for example, a user of the coating and developing apparatus 2. Further, the imaging instruction in the imaging unit U3 may actually be the execution of a previously prepared program regarding a substrate processing of the workpiece W.

The imaging controller 102 has a function of performing, based on the instruction acquired in the imaging instruction acquisition unit 101, a control for imaging a predetermined position of the workpiece W after being processed in the imaging unit U3. Here, the predetermined position may be any one of the front surface of the workpiece W, the periphery of the front surface of the workpiece W, and the end surface of the workpiece W.

The surface image acquisition unit 103 has a function of acquiring the captured image of the front surface of the workpiece W from the camera mounted to any one of the surface visible light imaging subunit 40, the first surface ultraviolet light imaging subunit 60, and the second surface ultraviolet light imaging subunit 70 of the imaging unit U3. Specifically, the surface image acquisition unit 103 acquires the image data obtained by any one of the cameras 41, 61, and 71.

The periphery image acquisition unit 104 has a function of acquiring the captured images of the periphery of the front surface of the workpiece W and the end surface of the workpiece W from the camera of the peripheral visible light imaging subunit 50 or the peripheral ultraviolet light imaging subunit 80 of the imaging unit U3. Specifically, the periphery image acquisition unit 104 acquires the image data obtained by either one of the cameras 51 and 81.

The image storage unit 105 has a function of storing the images acquired by the surface image acquisition unit 103 and the periphery image acquisition unit 104. The image information stored in the image storage unit 105 is used in the inspection of the workpiece W.

The inspection instruction acquisition unit 106 has a function of acquiring an instruction regarding the inspection of the workpiece W based on the image of the workpiece W captured by the imaging unit U3. The instruction may be given by, for example, the user of the coating and developing apparatus 2. Further, the instruction regarding the inspection may actually be the execution of the previously prepared program regarding the substrate processing of the workpiece W.

The image inspection unit 107 has a function of performing, based on the instruction acquired in the inspection instruction acquisition unit 106, a control for carrying out an inspection of the workpiece W using the image of the workpiece W. The inspection of the workpiece W using the image refers to an inspection of presence or absence of a defect on the front surface or the end surface of the workpiece W, an inspection of a state of bending that occurs at the periphery of the workpiece W, and an inspection of a removing state (so-called EBR) of a processing film on the peripheral portion of the workpiece W, or the like. Besides, an inspection on the properties of the film or the shape of the workpiece W may be performed by using the image stored in the above-described image storage unit 105.

The output unit 108 has a function of outputting, for example, an inspection result in the image inspection unit 107 to a display device or an external device. An output destination may be, by way of example, a display device such as a monitor, or another device using the image-based inspection result, or the like.

Figure 7:
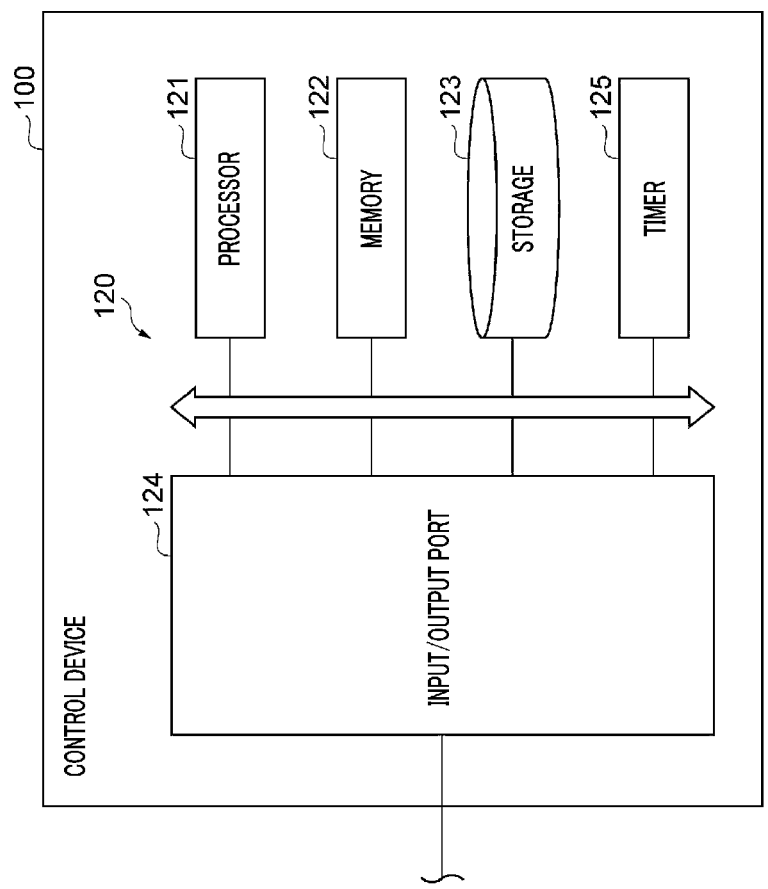
FIG. 7 is a block diagram illustrating an example of a hardware configuration of the control device.

The control device 100 is composed of one or more control computers. For example, the control device 100 has a circuit 120 shown in FIG. 7. The circuit 120 includes one or more processors 121, a memory 122, a storage 123, and an input/output port 124. The storage 123 has a computer-readable recording medium such as, but not limited to, a hard disk. The recording medium stores therein a program for causing the control device 100 to execute a substrate inspection sequence to be described later. The recording medium may be a removable medium such as a nonvolatile semiconductor memory, a magnetic disk, or an optical disk. The memory 122 temporarily stores therein the program loaded from the recording medium of the storage 123 and a calculation result by the processor 121. The processor 121 executes the program in cooperation with the memory 122, thereby configuring each of the above-described functional modules. The input/output port 124 performs an input/output of electrical signals with respect to a member as a control target in response to a command from the processor 121.

In addition, the hardware configuration of the control device 100 is not limited to constituting the individual functional modules by the program. By way of example, each functional module of the control device 100 may be implemented by a dedicated logic circuit or an ASIC (Application Specific Integrated Circuit) which is an integration of logic circuits.

Although the following exemplary embodiment will be described for the case where the above-described components are included in the control device 100, the control device 100 does not have to include all of the above-described functions. For example, a functional component as a database such as the image storage unit 105 may be provided in an external device.

Furthermore, the control device 100 and the display unit 200 may be connected to the carrier block 4, the processing block 5 and the interface block 6 in the coating and developing apparatus 2 via a wired or wireless network. That is, the control device 100 may be provided at a position spaced apart from a block that actually processes the workpiece W in the coating and developing apparatus 2.

[Processing Sequence]

Now, a processing sequence performed by the coating and developing apparatus 2 will be discussed.

In the processing sequence, first, the control device 100 controls the transfer device A1 to transfer the workpiece W as a processing target in the carrier C to the shelf unit U10, and then controls the transfer device A7 to place this workpiece W in the cell for the processing module 11.

Next, the control device 100 controls the transfer device A3 to transfer the workpiece W of the shelf unit U10 to the coating unit U1 and the heat treatment unit U2 within the processing module 11. Further, the control device 100 controls the coating unit U1 and the heat treatment unit U2 to form the bottom film on the front surface of the workpiece W. Thereafter, the control device 100 controls the transfer device A3 to return the workpiece W having the bottom film formed thereon to the shelf unit U10, and controls the transfer device A7 to place this workpiece W in the cell for the processing module 12.

Subsequently, the control device 100 controls the transfer device A3 to transfer the workpiece W of the shelf unit U10 to the coating unit U1 and the heat treatment unit U2 within the processing module 12. Further, the control device 100 controls the coating unit U1 and the heat treatment unit U2 to form the intermediate film on the bottom film of the workpiece W. For example, the control device 100 controls the coating unit U1 to coat the processing liquid for forming the intermediate film on the bottom film of the workpiece W to form the intermediate film. Then, the control device 100 controls the heat treatment unit U2 to perform a heat treatment on the intermediate film. After the formation of the intermediate film, the control device 100 controls the transfer device A3 to transfer the workpiece W to the imaging unit U3, and controls the imaging unit U3 to image the front surface of the workpiece W to acquire image information. Thereafter, the control device 100 controls the transfer device A3 to return the workpiece W to the shelf unit U10, and controls the transfer device A7 to place this workpiece W in the cell for the processing module 13.

Subsequently, the control device 100 controls the transfer device A3 to transfer the workpiece W of the shelf unit U10 to each unit within the processing module 13, and controls the coating unit U1 and the heat treatment unit U2 to form the resist film on the intermediate film of the workpiece W. For example, the control device 100 controls the coating unit U1 to coat the processing liquid for forming the resist film onto the intermediate film of the workpiece W to form the resist film. Next, the control device 100 controls the heat treatment unit U2 to perform a heat treatment on the resist film. After the formation of the resist film, the control device 100 controls the transfer device A3 to transfer the workpiece W to the imaging unit U3, and controls the imaging unit U3 to image the front surface of the workpiece W to acquire image information (image after processing). Thereafter, the control device 100 controls the transfer device A3 to transfer the workpiece W to the shelf unit U11.

Next, the control device 100 controls the transfer device A8 to send the workpiece W of the shelf unit U11 to the exposure apparatus 3. Thereafter, the control device 100 controls the transfer device A8 to receive the exposed workpiece W from the exposure apparatus 3 and place it in the cell for the processing module 14 in the shelf unit U11.

Afterwards, the control device 100 controls the transfer device A3 to transfer the workpiece W of the shelf unit U11 to each unit within the processing module 14, and controls the coating unit U1 and the heat treatment unit U2 to perform the developing processing on the resist film R of the workpiece W. Thereafter, the control device 100 controls the transfer device A3 to return the workpiece W to the shelf unit U10, and controls the transfer device A7 and the transfer device A1 to return the workpiece W to the carrier C. Through these operations, the processing is completed.

[Substrate Inspection Method]

Figure 8:
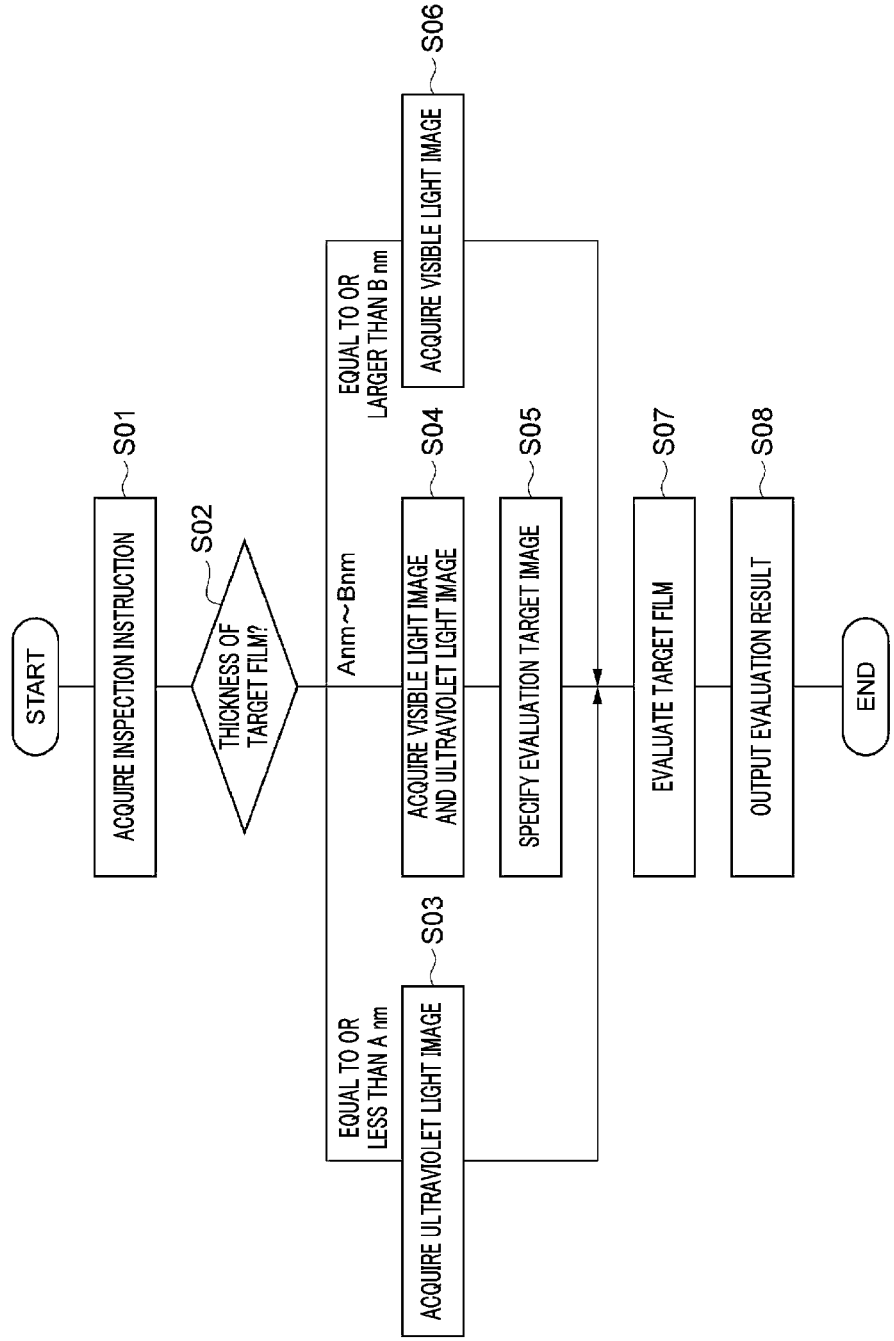
FIG. 8 is a flowchart illustrating an example of an inspection process.

Referring to FIG. 8, a substrate inspection method performed under the control of the control device 100 of the coating and developing apparatus 2 will be described.

First, the control device 100 performs a process S01. In the process S01, the imaging instruction acquisition unit 101 acquires an imaging instruction, and the inspection instruction acquisition unit 106 acquires an inspection instruction. Here, it is assumed that the control device 100 acquires a series of instructions related to the substrate processing including the inspection of the workpiece W. In this case, the control device 100 needs to obtain the imaging instruction and the inspection instruction. Further, in the instructions obtained in the process S01, it may also be determined whether to image the front surface of the workpiece W or to image the periphery and the end surface of the workpiece W.

Next, the control device 100 performs a process S02. In the process S02, the imaging controller 102 determines a type of an image to be captured based on a thickness of the film (target film) to be inspected.

As an example, the imaging controller 102 makes a determination upon whether to acquire a visible light image of the target film or to acquire an ultraviolet light image of the target film based on the thickness of the target film. This is because the type of image for performing the substrate inspection with higher precision differs depending on the thickness of the target film.

An image captured by using visible light is effective for a film with a certain film thickness, but it is difficult to inspect a state of a film having a very small thickness (e.g., 20 nm or less) through this image. This is because the target film is often transparent so the visible light penetrates a surface of the target film. Meanwhile, by using ultraviolet light having a shorter wavelength than the visible light, it becomes possible to inspect the characteristics of the surface of the target film through an image thereof even when the thickness of the target film is small. Thus, an image to be used for the substrate inspection is selected based on the thickness of the target film.

As an example, in the following description, film thicknesses of two classes (A nm, B nm; A<B) are set as a criterion for selecting an image to be used and the type of an image to be captured is specified according to which range the film thickness falls in. For example, A may be set to range from 15 nm to 30 nm, and B may be set to range from 30 nm to 70 nm. However, the numerical ranges of A and B are not limited thereto.

By way of example, when the film thickness of the target film is A nm or less, there is a possibility that the characteristics of the target film may be inspected through an ultraviolet light image as described above. Accordingly, the control device 100 performs a process S03. In the process S03, an ultraviolet light image of the workpiece W is acquired by the surface image acquisition unit 103 and/or the periphery image acquisition unit 104. Further, when acquiring the ultraviolet light image, both a bright field image and a dark field image may be acquired. The bright field image is suitable for detecting abnormality such as a stain, a spot (water mark), or the like on the front surface of the workpiece W. Meanwhile, the dark field image is suitable for detecting a foreign matter or the like existing on the film of the workpiece W. Therefore, by acquiring these two types of images and using them for the substrate inspection, the surface inspection can be carried out with high precision even when the film thickness of the target film is particularly small.

If the film thickness of the target film is between A nm and B nm exclusive, the control device 100 performs a process S04. In the process S04, both an ultraviolet light image and a visible light image of the workpiece W are acquired by the surface image acquisition unit 103 and/or the periphery image acquisition unit 104. If the film thickness is in the range of A nm to B nm, although there is a possibility that the film can be evaluated appropriately even when using a visible light image, it is also assumed that sufficient information cannot be obtained with the visible light image depending on optical characteristics (for example, light transmittance, etc.) of the target film. Thus, both the images are acquired. Thereafter, as a process S05, the image inspection unit 107 may determine which image is to be used for the evaluation. As a criterion for determining the image to be used for the evaluation in the image inspecting unit 107, adopting one having a large variation in pixel values among the visible light image and the ultraviolet light image (bright field image) may be considered, but is not limited thereto. Further, once the image to be used for the evaluation is determined, information specifying which image has been selected may be stored in the control device 100 so that the same image is used for a next workpiece W on which a target film of the same kind or the same thickness is formed.

Furthermore, when the film thickness of the target film is B nm or more, the control device 100 performs a process S06 because it is assumed that the characteristics of the target film can be sufficiently inspected with a visible light image. In the process S06, a visible light image of the workpiece W is acquired by the surface image acquisition unit 103 and/or the periphery image acquisition unit 104. The acquired image is stored in the image storage unit 105.

After obtaining the visible light image or the ultraviolet light images (the bright field image and the dark field image) depending on the film thickness of the target film through the above-described sequence, the control device 100 performs a process S07. In the process S07, the image inspection unit 107 evaluates (inspects) the target film of the workpiece W by using the visible light image or the ultraviolet light image stored in the image storage unit 105.

Next, the control device 100 performs a process S08. In the process S08, a result of the above-described evaluation is outputted by the output unit 108.

In FIG. 8, although the series of processes have been described in the order of S01 to S08, this order may be changed appropriately. By way of example, the acquisition of the inspection instruction described in the process S01 may be acquired at a timing different from that of the process S01, and this acquisition of the inspection instruction may serve as a trigger for performing the process S07. Further, if it is designated in the content of the instruction acquired in the process S01 which one of the visible light image and the ultraviolet light image is to be used for the evaluation, the image to be acquired may be determined based on the instruction instead of determining the sequence based on the film thickness of the target film as in the process S02. As an example, information specifying the film thickness of the target film and information specifying the image to be used when inspecting the target film may be included in information that specifies the formation sequence of the target film on the workpiece W, or the like. In such a case, the type of the image to be captured for the inspection may be specified among the visible light image and the ultraviolet light image (bright field image or dark field image) based on these information.

Effects

In the coating and developing apparatus 2 corresponding to the substrate inspection apparatus and the substrate inspection method, the visible light image of the substrate is acquired by the cameras 41 and 51 having a function as the first imaging sensor. Further, the ultraviolet light image of the substrate is acquired by the cameras 61, 71, and 81 having a function as the second image sensor. The visible light image and the ultraviolet light image are images captured by imaging a common region of the substrate. For this reason, depending on the characteristics of the target film formed on the substrate, the inspection can be performed by using either one of these images. Thus, it is possible to obtain an image that enables detection of a defect of the substrate with higher precision.

Both the visible light image and the ultraviolet light image may be images captured by imaging the common region of the entire surface of the substrate. With this configuration, it is possible to inspect the entire surface of the substrate based on these images.

Both the visible light image and the ultraviolet light image may be images captured by imaging the common region of a peripheral portion of the substrate. With this configuration, it is possible to inspect the peripheral portion of the substrate based on these images.

When the film thickness of the target film formed on the surface of the substrate is equal to or larger than a first film thickness value (for example, B nm in the above-described exemplary embodiment), the first imaging sensor and the second imaging sensor may be controlled by the control device 100 to capture only the visible light image. As described above, if the film thickness of the target film increases, the inspection of the target film can be carried out by using the visible light image. Therefore, with the above-described configuration, it is possible to acquire an image enabling detection of a defect of the substrate with high precision for the target film having a film thickness equal to or larger than the first film thickness value.

When the film thickness of the target film formed on the surface of the substrate is equal to or less than a second film thickness value (for example, A nm in the above-described exemplary embodiment), the first imaging sensor and the second imaging sensor may be controlled by the control device 100 to capture only the ultraviolet light image. If the film thickness of the target film decreases, the inspection of the target film can be carried out by using the ultraviolet light image. Therefore, with the above-described configuration, it is possible to obtain an image enabling detection of a defect of the substrate with high precision for the target film having a film thickness equal to or less than the second film thickness value.

When the film thickness of the target film formed on the surface of the substrate falls between a third film thickness value and a fourth film thickness value (for example, between A nm and B nm in the above-described exemplary embodiment), the first imaging sensor and the second imaging sensor may be controlled by the control device 100 to capture both the visible light image and the ultraviolet light image. Depending on the film thickness of the target film, it may not be clear which of the visible light image and the ultraviolet light image is suitable for the inspection. In such a case, by adopting the above-described configuration, an image suitable for a defect of the substrate can be used for the inspection.

The control device 100 may determine whether to capture the visible light image or to capture the ultraviolet light image based on the formation sequence of the target film on the substrate. Further, based on the result, the first imaging sensor and the second imaging sensor may be controlled. If the image to be used for the inspection is specified in the formation sequence of the target film, or if information specifying which image is suitable for the inspection is included in the formation sequence of the target film, the image to be used may be determined based on this information, and each imaging sensor may be controlled accordingly.

Also, like the above-described cameras 61, 71 and 81, the second imaging sensor may be capable of capturing both a bright field image and a dark field image as the ultraviolet light image. At this time, the control device 100 may acquire the bright field image and the dark field image as the ultraviolet light image. In the ultraviolet light image, different information about the substrate may sometimes be obtained from the bright field image and the dark field image. Thus, by adopting the configuration in which both of the bright field and dark field images are acquired, it is possible to obtain an image suitable for higher-precision inspection of the substrate.

Further, based on the formation sequence of the target film on the substrate, the control device 100 may determine which one of the bright field image and the dark field image is to be captured by the second imaging sensor, and may control the second imaging sensor based on the result. It is assumed that the image to be used for the inspection is specified in the formation sequence of the target film, and information specifying which image is suitable for the inspection is included in the formation sequence of the target film. In such a case, the bright field image or the dark field image to be used may be selected based on this information, and each image sensor may be controlled.

MODIFICATION EXAMPLES

So far, the various exemplary embodiments have been described. However, the exemplary embodiments are not limiting, and various omissions, substitutions and changes may be made. Further, other exemplary embodiments may be embodied by combining elements in the various exemplary embodiments in a variety of other forms.

By way of example, in the above-described exemplary embodiments, the wavelength of the ultraviolet light used to acquire the ultraviolet light image is not limited to the above-mentioned wavelength range of about 300 nm to 400 nm, which is a so-called near ultraviolet light range. That is, it may be possible to use near-ultraviolet light having a wavelength of 200 nm to 300 nm or far-ultraviolet light having a wavelength shorter than 200 nm as the ultraviolet light for use in acquiring the ultraviolet light image.

Further, although the above exemplary embodiments have been described for the case where both the visible light image and the ultraviolet light image are simultaneously obtained by the single imaging unit U3 while moving the workpiece W, the present disclosure is not limited thereto, and the visible light image and the ultraviolet light image may be obtained sequentially. Furthermore, the layout of the light sources and the cameras within the imaging unit U3 may be appropriately changed. In addition, the number and the layout of optical elements for adjusting the path of light in each imaging subunit may be appropriately changed according to the layout of the light sources and the cameras.

In addition, the above exemplary embodiments have been described for the case where the peripheral ultraviolet light imaging subunit 80 captures both the bright field image and the dark field image. However, like the first surface ultraviolet light imaging subunit 60 and the second surface ultraviolet light imaging subunit 70, a configuration for acquiring the bright field image and a configuration for acquiring the dark field image may be separately provided. Conversely, as a configuration for capturing an ultraviolet light image of the surface, a configuration in which the bright field image and the dark field image are acquired in a single subunit may be adopted.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting. The scope of the inventive concept is defined by the following claims and their equivalents rather than by the detailed description of the exemplary embodiments. It shall be understood that all modifications and embodiments conceived from the meaning and scope of the claims and their equivalents are included in the scope of the inventive concept.

According to the exemplary embodiment, it is possible to provide the technique of acquiring the image from which the defect of the substrate can be detected with higher precision.

I claim:

1. A substrate inspection apparatus configured to inspect a substrate having a target film formed on a surface thereof by using an image of the substrate, the substrate inspection apparatus comprising:
   a holder configured to hold the substrate;
   a first light source unit configured to emit visible light to the substrate held by the holder;
   a second light source unit configured to emit ultraviolet light to the substrate held by the holder;
   a first imaging sensor configured to perform capturing of a visible light image of the substrate by receiving reflected light from the substrate as a result of radiating the visible light;
   a second imaging sensor configured to perform capturing of an ultraviolet light image of the substrate by receiving reflected light or scattered light from the substrate as a result of radiating the ultraviolet light; and
   a controller configured to acquire the visible light image and the ultraviolet light image,
   wherein the visible light image and the ultraviolet light image are images obtained by imaging a common region of the substrate, and
   the controller controls the first imaging sensor and the second imaging sensor such that only the capturing of the visible light image is performed by the first imaging sensor when a film thickness of the target film formed on the surface of the substrate is equal to or larger than a first film thickness value.

2. The substrate inspection apparatus of claim 1,
   wherein the visible light image and the ultraviolet light image are images obtained by imaging the common region of an entire surface of the substrate.

3. The substrate inspection apparatus of claim 1,
wherein the visible light image and the ultraviolet light image are images obtained by imaging the common region of a peripheral portion of the substrate.

4. A substrate inspection apparatus configured to inspect a substrate having a target film formed on a surface thereof by using an image of the substrate, the substrate inspection apparatus comprising:
a holder configured to hold the substrate;
a first light source unit configured to emit visible light to the substrate held by the holder;
a second light source unit configured to emit ultraviolet light to the substrate held by the holder;
a first imaging sensor configured to perform capturing of a visible light image of the substrate by receiving reflected light from the substrate as a result of radiating the visible light;
a second imaging sensor configured to perform capturing of an ultraviolet light image of the substrate by receiving reflected light or scattered light from the substrate as a result of radiating the ultraviolet light; and
a controller configured to acquire the visible light image and the ultraviolet light image,
wherein the visible light image and the ultraviolet light image are images obtained by imaging a common region of the substrate, and
the controller controls the first imaging sensor and the second imaging sensor such that only the capturing of the ultraviolet light image is performed by the second imaging sensor when a film thickness of the target film formed on the surface of the substrate is equal to or less than a second film thickness value.

5. The substrate inspection apparatus of claim 1,
A substrate inspection apparatus configured to inspect a substrate having a target film formed on a surface thereof by using an image of the substrate, the substrate inspection apparatus comprising:
a holder configured to hold the substrate;
a first light source unit configured to emit visible light to the substrate held by the holder;
a second light source unit configured to emit ultraviolet light to the substrate held by the holder;
a first imaging sensor configured to perform capturing of a visible light image of the substrate by receiving reflected light from the substrate as a result of radiating the visible light;
a second imaging sensor configured to perform capturing of an ultraviolet light image of the substrate by receiving reflected light or scattered light from the substrate as a result of radiating the ultraviolet light; and
a controller configured to acquire the visible light image and the ultraviolet light image,
wherein the visible light image and the ultraviolet light image are images obtained by imaging a common region of the substrate, and
the controller controls the first imaging sensor and the second imaging sensor such that both the capturing of the visible light image by the first imaging sensor and the capturing of the ultraviolet light image by the second imaging sensor are performed when a film thickness of the target film formed on the surface of the substrate falls between a third film thickness value and a fourth film thickness value.

6. The substrate inspection apparatus of claim 1,
wherein the controller determines, based on a formation sequence of the target film on the substrate, which one of the capturing of the visible light image by the first imaging sensor and the capturing of the ultraviolet light image by the second imaging sensor is to be performed, and controls the first imaging sensor and the second imaging sensor based on a determination result.

7. The substrate inspection apparatus of claim 1,
wherein the second imaging sensor is allowed to capture a bright field image and a dark field image as the ultraviolet light image, and
the controller acquires the bright field image and the dark field image as the ultraviolet light image from the second imaging sensor.

* * * * *